US009614829B1

(12) United States Patent
Molina-Markham et al.

(10) Patent No.: US 9,614,829 B1
(45) Date of Patent: Apr. 4, 2017

(54) DEAUTHENTICATION IN MULTI-DEVICE USER ENVIRONMENTS

(71) Applicant: EMC Corporation, Hopkinton, MA (US)

(72) Inventors: Andres D. Molina-Markham, Cambridge, MA (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 125 days.

(21) Appl. No.: 14/670,718

(22) Filed: Mar. 27, 2015

(51) Int. Cl.
*H04L 29/06* (2006.01)
*H04L 9/32* (2006.01)
(Continued)

(52) U.S. Cl.
CPC .......... *H04L 63/08* (2013.01); *G06F 21/105* (2013.01); *G06F 21/121* (2013.01); *G06F 21/31* (2013.01);
(Continued)

(58) Field of Classification Search
CPC .......... G06F 21/30; G06F 21/31; G06F 21/34; G06F 21/35; G06F 21/88; G06F 21/105; G06F 21/12; G06F 21/121; G06F 21/123; H04L 63/08; H04L 63/0807; H04L 63/0853; H04L 63/0492; H04L 63/104;
(Continued)

(56) References Cited

U.S. PATENT DOCUMENTS 5,390,297 A * 2/1995 Barber ................. G06F 21/105
  705/59
7,366,677 B1 * 4/2008 Liu ........................ B60R 25/00
  340/5.25
(Continued)

FOREIGN PATENT DOCUMENTS

FR      EP 1291748 A2 *   3/2003   ............. G06F 21/35

OTHER PUBLICATIONS

Castillo, Javier, et al. "Developing a User Identification Mechanism for Secure Mobile Phone Access Replacing the Tedious Username/Password." Pace University Fall (2014).*
(Continued)

*Primary Examiner* — Michael Simitoski
(74) *Attorney, Agent, or Firm* — Ryan, Mason & Lewis, LLP (57) ABSTRACT

A processing device comprises a processor coupled to a memory and is configured to establish secure communications with a plurality of user devices associated with a particular user, to generate an exclusive authentication token for utilization by each of the plurality of user devices in unlocking of secure functionality associated with that device, to provide the exclusive authentication token to only a subset of the plurality of user devices at a given time, and to force deauthentication of any of the plurality of user devices that do not currently have possession of the exclusive authentication token. These operations in some embodiments are performed by a deauthentication server implemented by the processing device. The processing device
(Continued)

implementing the deauthentication server may comprise, for example, a remote server accessible to the plurality of user devices over a network, a smart watch or other wearable device of the user, or a user device.

20 Claims, 4 Drawing Sheets

(51) Int. Cl.

| | | |
|---|---|---|
| G06F 21/00 | (2013.01) | |
| G06F 21/35 | (2013.01) | |
| G06F 21/10 | (2013.01) | |
| H04W 12/08 | (2009.01) | |
| G06F 21/12 | (2013.01) | |
| G06F 21/31 | (2013.01) | |
| H04W 12/06 | (2009.01) | |
| G06F 21/34 | (2013.01) | |
| H04M 1/725 | (2006.01) | |

(52) U.S. Cl.
CPC .............. *G06F 21/34* (2013.01); *G06F 21/35* (2013.01); *H04L 9/3234* (2013.01); *H04L 63/0807* (2013.01); *H04L 63/0853* (2013.01); *H04L 63/20* (2013.01); *H04W 12/06* (2013.01); *H04W 12/08* (2013.01); *H04M 1/7253* (2013.01)

(58) Field of Classification Search
CPC ........... H04L 2209/805; H04L 9/3234; H04W 12/06; H04W 12/08; H04M 1/72577
See application file for complete search history.

(56) References Cited

U.S. PATENT DOCUMENTS

| | | | | |
|---|---|---|---|---|
| 8,976,965 | B2* | 3/2015 | Aminzade | H04L 41/0816 380/258 |
| 9,118,670 | B2* | 8/2015 | Martin | H04W 12/06 |
| 2005/0237185 | A1 | 10/2005 | Brown et al. | |
| 2007/0083915 | A1* | 4/2007 | Janakiraman | G06F 21/316 726/4 |
| 2008/0104706 | A1* | 5/2008 | Karp | H04L 63/0428 726/26 |
| 2009/0031432 | A1* | 1/2009 | Wakai | G06F 21/10 726/33 |
| 2009/0209314 | A1* | 8/2009 | Rybak | G06F 21/105 463/20 |
| 2010/0049989 | A1* | 2/2010 | Lee | G06F 21/105 713/189 |
| 2011/0004943 | A1* | 1/2011 | Chaganti | H04L 29/06 726/30 |
| 2011/0112917 | A1* | 5/2011 | Driessen | G06Q 20/12 705/16 |
| 2011/0195665 | A1 | 8/2011 | Friedlaender | |
| 2011/0225426 | A1 | 9/2011 | Agarwal et al. | |
| 2011/0275321 | A1* | 11/2011 | Zhou | H04M 1/6091 455/41.2 |
| 2011/0314539 | A1* | 12/2011 | Horton | G06F 21/35 726/26 |
| 2012/0021724 | A1* | 1/2012 | Olsen | G06F 21/35 455/411 |
| 2012/0079601 | A1* | 3/2012 | Gava | G06F 21/10 726/26 |
| 2013/0024932 | A1* | 1/2013 | Toebes | G06F 21/31 726/19 |
| 2013/0125240 | A1* | 5/2013 | Xu | G06F 21/105 726/26 |
| 2013/0191902 | A1* | 7/2013 | Friedl | H04L 9/3271 726/7 |
| 2013/0303143 | A1 | 11/2013 | Schrader et al. | |
| 2013/0316644 | A1 | 11/2013 | Hirabayashi et al. | |
| 2014/0047019 | A1* | 2/2014 | Midtun | H04L 51/043 709/204 |
| 2014/0165165 | A1* | 6/2014 | Story, Jr. | H04W 12/04 726/6 |
| 2014/0283018 | A1 | 9/2014 | Dadu et al. | |
| 2014/0289835 | A1 | 9/2014 | Varshavsky et al. | |
| 2014/0337924 | A1* | 11/2014 | Smith | H04L 63/10 726/4 |
| 2015/0028996 | A1* | 1/2015 | Agrafioti | G06F 21/40 340/5.82 |
| 2015/0058942 | A1* | 2/2015 | Dermu | G06F 21/445 726/6 |
| 2015/0070134 | A1* | 3/2015 | Nagisetty | G07C 9/00111 340/5.61 |
| 2015/0081169 | A1* | 3/2015 | Pisz | B60H 1/00657 701/36 |
| 2015/0095237 | A1* | 4/2015 | Naik | G06Q 10/00 705/59 |
| 2015/0162994 | A1* | 6/2015 | Rodzevski | G07C 9/00309 455/39 |
| 2015/0172264 | A1* | 6/2015 | Hardy | H04L 63/0853 726/4 |
| 2015/0213250 | A1* | 7/2015 | Wu | G06F 21/36 726/19 |
| 2015/0286813 | A1* | 10/2015 | Jakobsson | G06F 21/35 726/9 |
| 2016/0080154 | A1* | 3/2016 | Lee | G06F 21/35 713/185 |
| 2016/0092665 | A1* | 3/2016 | Cowan | G06F 21/35 726/9 |
| 2016/0154952 | A1* | 6/2016 | Venkatraman | G06F 21/32 705/44 |
| 2016/0226914 | A1* | 8/2016 | Doddy | G06F 21/45 |
| 2016/0255068 | A1* | 9/2016 | Pritchard | G06F 21/35 |

OTHER PUBLICATIONS

Apple, "OS X Mavericks," Core Technologies Overview, http://images.apple.com/media/us/osx/2013/docs/OSX_Mavericks_Core_Technology_Overview.pdf, Oct. 2013, 36 pages.

M.Y. Becker et al., "SecPAL: Design and Semantics of a Decentralized Authorization Language," Journal of Computer Security—Digital Identity Management (DIM), Dec. 2010, pp. 619-665, vol. 18, No. 4.

M.D. Corner et al., "Zero-Interaction Authentication," Proceedings of the 8th Annual International Conference on Mobile Computing and Networking (MobiCom), Sep. 2002, 11 pages.

S. Egelman et al., "Are You Ready to Lock? Understanding User Motivations for Smartphone Locking Behaviors," Proceedings of the ACM SIGSAC Conference on Computer and Communications Security (CCS), Nov. 2014, pp. 750-761.

T. Feng et al., "TIPS: Context-Aware Implicit User Identification Using Touch Screen in Uncontrolled Environments," Proceedings of the 15th Workshop on Mobile Computing Systems and Applications (HotMobile), Article No. 9, Feb. 2014, 6 pages.

D. Gafurov et al., "Biometric Gait Authentication Using Accelerometer Sensor," Journal of Computers, Oct.-Nov. 2006, pp. 51-59, vol. 1, No. 7.

Google, "Android 5.0, Lollipop—A Sweet New Take on Android," http://www.android.com/versions/lollipop-5-0/, Nov. 2014, 6 pages.

Y. Gurevich et al., "DKAL: Distributed-Knowledge Authorization Language," IEEE 21st Computer Security Foundations Symposium (CSF), Jun. 2008, pp. 149-162.

M. Jakobsson et al., "Implicit Authentication for Mobile Devices," Proceedings of the 4th USENIX Conference on Hot Topics in Security, Aug. 2009, 6 pages.

Luke Korth, "Dislock," https://play.google.com/store/apps/details?id=com.lukekorth.pebblelocker&hl=en, Nov. 14, 2014, 3 pages.

B. Laurie et al., "Choose the Red Pill and the Blue Pill—A Position Paper," Proceedings of the Workshop on New Security Paradigms (NSPW), Sep. 2008, pp. 127-133.

(56) References Cited

OTHER PUBLICATIONS

S. Mare et al., "ZEBRA: Zero-Effort Bilateral Recurring Authentication," IEEE Symposium on Security and Privacy (SP), May 2014, pp. 705-720.

E. Shi et al., "Implicit Authentication Through Learning User Behavior," Proceedings of the 13th International Conference on Information Security (ISC), Oct. 2010, pp. 99-113.

S. Sinclair et al., "Preventative Directions for Insider Threat Mitigation Via Access Control," Insider Attack and Cyber Security, Advances in Information Security, Jan. 2008, pp. 165-194, vol. 39.

S.W. Smith et al., "Healthcare Information Technology's Relativity Problems: a Typology of How Patients' Physical Reality, Clinicians' Mental Models, and Healthcare Information Technology Differ," Journal of the American Medical Informatics Association, Jan.-Feb. 2014, pp. 117-131, vol. 21, No. 1.

Frank Stajano, "Pico: No More Passwords!*," Proceedings of the 19th International Conference on Security Protocols (SP), Aug. 2011, pp. 49-81.

\* cited by examiner

DEAUTHENTICATION IN MULTI-DEVICE USER ENVIRONMENTS

FIELD

The field relates generally to information security, and more particularly to techniques for controlling access to user devices.

BACKGROUND

In a typical multi-device user environment, a given user has access to several distinct user devices including at least one desktop, laptop or tablet computer terminal and a mobile telephone. The user may switch between such devices frequently throughout the day.

For security, users generally rely on timeouts for locking screens on computer terminals and mobile telephones. However, such timeouts can be ineffective in that users often extend the designated timeout periods in order to avoid frequent reauthentication on their devices. More particularly, the use of an excessively long timeout period on a given user device unduly extends the window of opportunity for an attacker to gain access to that device when the user leaves the device unattended.

In addition, implementation of conventional timeout periods on multiple devices can be a source of considerable inconvenience and annoyance for the user, and a significant limitation on the overall usability of the devices.

Accordingly, a need exists for techniques that address the security and usability problems associated with use of conventional timeouts in multi-device user environments.

SUMMARY

Illustrative embodiments of the present invention provide what is referred to herein as "deauthentication" in multi-device user environments. For example, in a multi-device user environment comprising a plurality of user devices associated with a user, deauthentication in some embodiments involves automatically forcing the performance of one or more specified deauthentication tasks on one or more of the user devices when the user starts to utilize another one of the user devices, so as to ensure that the user cannot utilize secure functionality of multiple ones of the user devices at the same time. Use of secure functionality of any particular one of the user devices in such an embodiment illustratively requires the device to have access to an exclusive authentication token that is controlled by a deauthentication server. This advantageously overcomes the security and usability problems associated with the use of extended timeout periods in conventional practice.

In one embodiment, a processing device comprises a processor coupled to a memory and is configured to establish secure communications with at least a subset of a plurality of user devices associated with a particular user, to generate an exclusive authentication token for utilization by each of the plurality of user devices in unlocking of secure functionality associated with that device, to provide the exclusive authentication token to only a subset of the plurality of user devices at a given time, and to force deauthentication of any of the plurality of user devices that do not currently have possession of the exclusive authentication token.

As indicated above, these operations in some embodiments are performed at least in part by a deauthentication server implemented by the processing device. The processing device implementing the deauthentication server may comprise, for example, a remote server accessible to the plurality of user devices over a network, a smart watch or other wearable device of the user, one of the plurality of user devices, or an additional user device.

These and other illustrative embodiments described herein include, without limitation, apparatus, systems, methods and processor-readable storage media.

DETAILED DESCRIPTION

Illustrative embodiments of the present invention will be described herein with reference to exemplary information processing systems and associated computers, mobile telephones or other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines, containers or other cloud infrastructure.

Figure 1:
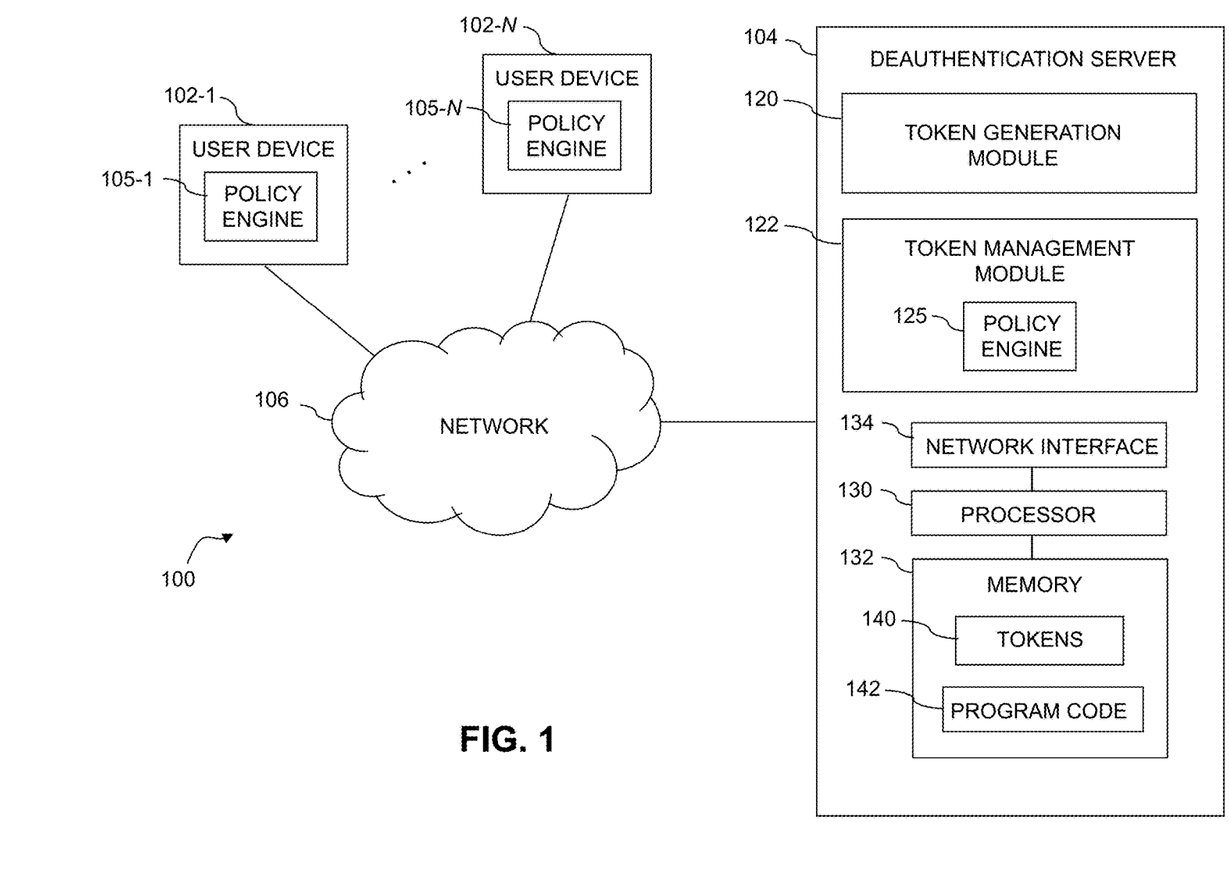
FIG. 1 shows an information processing system configured to provide deauthentication in a multi-device user environment in an illustrative embodiment of the invention.

FIG. 1 shows an information processing system 100 configured in accordance with an illustrative embodiment of the invention. The system 100 comprises a plurality of user devices 102-1, . . . 102-N and a deauthentication server 104 that communicate with one another over a network 106. The value N denoting the total number of user devices 102 is arbitrary and can vary depending upon the particular devices present in a given implementation, but is generally assumed to be greater than or equal to two.

The user devices 102 illustratively comprise various combinations of desktop computers, laptop computers, tablet computers, mobile telephones, wearable devices, automobiles or other processing devices capable of accessing the deauthentication server 104 over the Internet. Numerous other operating scenarios involving a wide variety of different types and arrangements of processing devices are possible, as will be appreciated by those skilled in the art. For example, a given user device in some embodiments can illustratively comprise a virtual device, such as virtual machine or a container.

The deauthentication server 104 can similarly be implemented on any of a wide variety of different types of processing devices. For example, the deauthentication server 104 can be implemented on a processing device comprising a remote server accessible to the user devices 102 over the network 106. As another example, the deauthentication server 104 can be implemented on a wearable device. Embodiments in which a deauthentication server is implemented as a remote server and as a wearable device will be described below in conjunction with FIGS. 3 and 4, respectively, although it is to be appreciated that numerous other implementations of the deauthentication server 104 are possible. For example, in other embodiments the deauthentication server 104 can run on a particular one of the user devices 102, such as a mobile telephone of a given user. Alternatively, the deauthentication server can run on an additional user device that is not part of the set of user devices 102 but is nonetheless associated with the same user.

The network 106 may comprise, for example, a global computer network such as the Internet, a wide area network (WAN), a local area network (LAN), a satellite network, a telephone or cable network, a cellular network, a wireless network such as a Bluetooth, WiFi or WiMAX network, or various portions or combinations of these and other types of networks.

The system 100 in FIG. 1 is an example of what is more generally referred to herein as a "multi-device user environment." In such an environment, the N user devices 102 are all assumed to be associated with the same user. The deauthentication server 104 is configured to enforce what is referred to herein as "deauthentication" in such an environment. For example, the deauthentication server 104 is illustratively configured to automatically force the performance of one or more specified deauthentication tasks on one or more of the user devices 102 when the user starts to utilize another one of the user devices 102. In other embodiments, forced deauthentication can be triggered at least in part by a given user device responsive to retrieval of the exclusive authentication token from that device.

Such arrangements can be used to ensure that the user can utilize secure functionality of only one of the user devices 102 at any given time. The deauthentication in the present embodiment more particularly involves generation and control of an exclusive authentication token that is utilizable by only one of the N user devices 102 at a time. The deauthentication server 104 controls generation, transmission and retrieval of the exclusive authentication token such that secure functionality of a given one of the devices 102 can only be accessed if the device is currently in possession of the exclusive authentication token.

The FIG. 1 embodiment is based at least in part on recognition that a user in a multi-device user environment will typically only provide explicit input via a keyboard, mouse or touchscreen to one of the user devices at a time. The deauthentication server 104 effectively detects that an attempt is being made to use a particular one of the user devices to the exclusion of other user devices in the multi-device user environment, provides the exclusive authentication token to the particular user device that is currently active, and forces the deauthentication of the other user devices. As a result, conventional timeout periods are not needed and the security and usability problems associated with such periods are avoided.

The user devices 102-1 through 102-N comprise respective policy engines 105-1 through 105-N. Such policy engines 105 are utilized by the respective user devices 102 to implement one or more policies relating to the exclusive authentication token, as will be described in more detail elsewhere herein.

The deauthentication server 104 in the present embodiment more particularly comprises a token generation module 120 for generating the above-noted exclusive authentication token, and a token management module 122 for controlling which of the user devices 102 has possession of the exclusive authentication token. The token management functionality illustratively involves, for example, transmitting the exclusive authentication to a given user device and retrieving the exclusive authentication from that user device so that it can be provided to another user device. The token management module 122 also includes a policy engine 125 for implementing one or more policies relating to the exclusive authentication token and its provision to and retrieval from the user devices 102. For example, the policy engine 125 can be used to establish policies for granting or denying requests from the user devices 102 for access to the exclusive authentication token.

The policy engines 105 in respective ones of the user devices 102 are illustratively configured to establish policies for dealing with denial of token retrieval requests from the deauthentication server 104 as well as policies for other types of token retrieval or token return scenarios.

Figure 4:
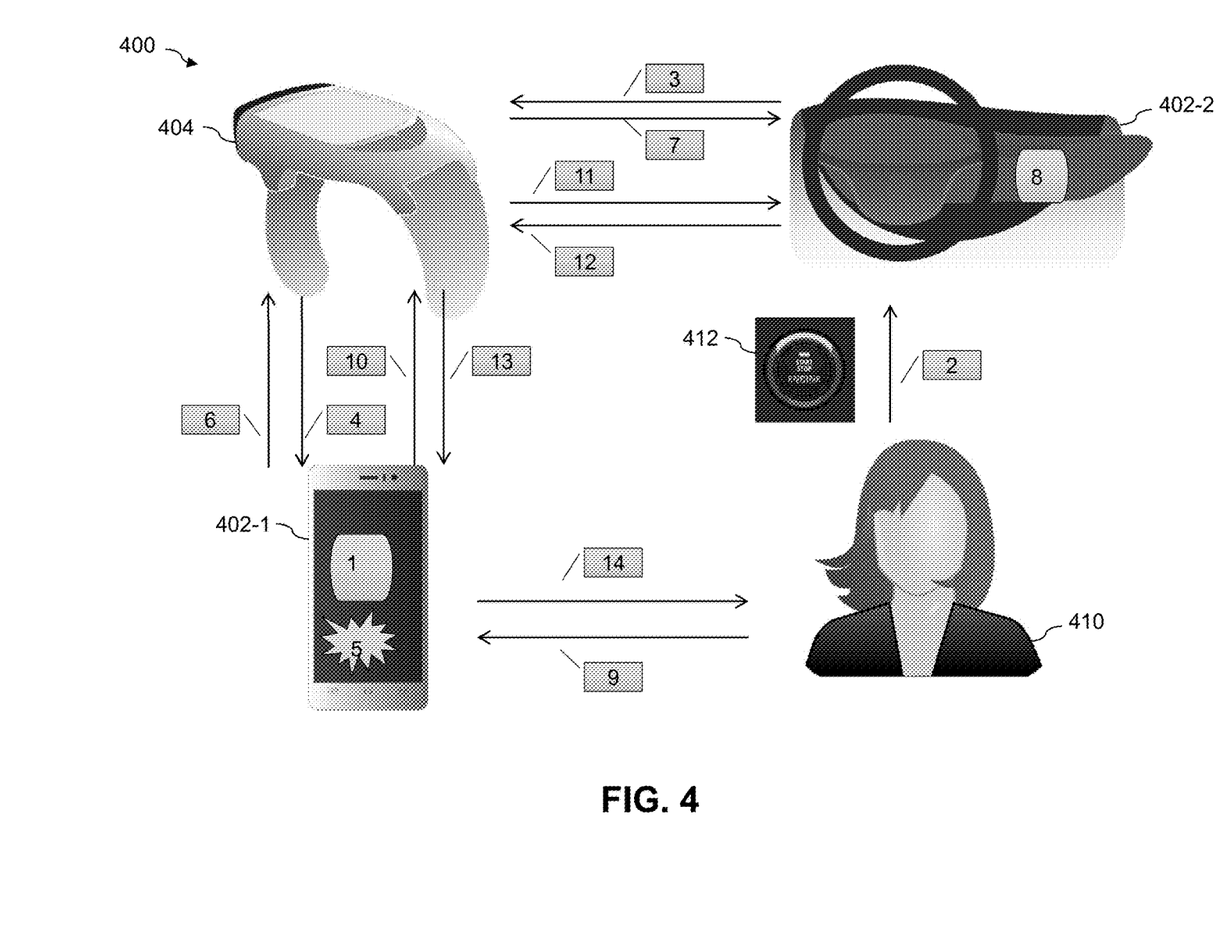

For example, in the FIG. 4 embodiment in which the deauthentication server is implemented as a wearable device and one of the user devices comprises an automobile, a policy engine in the automobile can deny an attempted retrieval of the exclusive authentication token by the deauthentication server if the automobile is currently in motion.

Other policy engines in other user devices can similarly implement policies that specify when to authorize or deny such token retrieval attempts by the deauthentication server. Additionally or alternatively, the policy engines in respective ones of the user devices could enforce policies for returning the exclusive authentication token to the deauthentication server when a given such user device determines that the corresponding secure functionality is no longer in use.

The policy engines 105 in the respective user devices 102 can also be utilized to determine one or more particular deauthentication tasks that should be triggered when the exclusive authentication token is retrieved by or returned to the deauthentication server 104.

It is assumed in the FIG. 1 embodiment that the deauthentication server 104 is configured to establish secure communications with each of the user devices 102. Such secure communications can be established using any of a number of different pairing protocols or other secure communication techniques including, for example, Near Field Communications (NFC), Bluetooth and Secure Sockets Layer (SSL) protocols. The deauthentication server 104 need not establish such secure communications simultaneously with all of the user devices 102. For example, it may be in communication with one or more of the devices at a given time and other ones of the devices at other times. Also, in some embodiments, the deauthentication server 104 may establish secure communications with only a subject of the user devices 102.

In these and other embodiments, the deauthentication server can be implemented at least in part as an on-line deauthentication service that the multiple user devices of a given multi-device user environment can subscribe to so as to ensure that none of the user devices are used simultaneously.

The deauthentication server 104 utilizes its token generation module 120 to generate the exclusive authentication token for utilization by each of the user devices 102 in unlocking secure functionality associated with that device. Thus, each of the user devices 102 in the present embodiment has designated secure functionality that cannot be unlocked without that device having possession of the exclusive authentication token generated by the deauthentication server 104. The designated secure functionality can include any type of functionality that is available on the corresponding user device. For example, if a given user device is a mobile telephone, the designated secure functionality can comprise calling functionality, texting functionality, or combinations of multiple such functionalities. Alternatively, the designated secure functionality can illustratively comprise substantially all of the functionality of the given user device, such that the device is not utilizable for any significant functionality unless such functionality is unlocked through possession of the exclusive authentication token.

The token management module 122 is configured via its associated policy engine 125 such that the deauthentication server 104 provides the exclusive authentication token to only one of the user devices 102 at a given time, and forces deauthentication of the other ones of the user devices 102 that do not currently have possession of the exclusive authentication token. For example, the deauthentication server 104 can force deauthentication of a given one of the user devices 102 by retrieving the exclusive authentication token from that device and providing it to another one of the user devices 102.

In conjunction with retrieval of the exclusive authentication token from the given user device, that device is illustratively forced to perform one or more deauthentication tasks that result in locking of the corresponding secure functionality. Accordingly, the secure functionality on that device is no longer accessible to the user unless and until the device is once again provided with the exclusive authentication token by the token management module 122 of the deauthentication server 104.

The above-described illustrative arrangement of the deauthentication server 104 and its associated modules 120 and 122 advantageously ensures that the exclusive authentication token is utilizable by only a single one of the user devices 102 at a given time. Accordingly, in this embodiment, when the secure functionality of any one of the user devices is unlocked, the secure functionality of each of the other ones of the plurality of user devices is locked.

The deauthentication server 104 in the present embodiment can therefore be viewed as controlling access to the exclusive authentication token among the user devices 102 such that when the secure functionality is in use on one of the user devices that has current access to the exclusive authentication token, the secure functionalities cannot be used on respective other devices of the multi-device user environment that do not have current access to the exclusive authentication token.

Thus, the present embodiment in conjunction with use of a given one of the user devices effectively locks or otherwise limits secure functionalities of the other devices. Notifications can be provided on each of the other devices to the effect that the user is about to be locked out on those devices because it appears that the user is using another one of the given devices.

Such an arrangement is both more secure and easier to use than the conventional timeout approaches previously described. For example, in some implementations it requires no cognitive or physical effort from the user to deauthenticate devices that are not currently being used. Instead, a given user device automatically deauthenticates as soon as the user stops using that device and starts using another one of the user devices.

Moreover, this arrangement does not impose a usability limitation because the deauthentication server 104 can be configured to provide seemingly simultaneous use of multiple user devices through rapid retrieval and transmission of the exclusive authentication token as different ones of the devices are used. Accordingly, embodiments can be advantageously configured, for example, to manage exclusive interaction with applications running on user devices without adversely impacting usability.

As indicated previously, the user devices 102 and deauthentication server 104 in the FIG. 1 embodiment are implemented as respective processing devices. Each such processing device generally comprises at least one processor and an associated memory, and implements one or more functional modules for controlling certain features of the system 100.

The processing device implementing the deauthentication server 104 in the FIG. 1 embodiment comprises a processor 130 coupled to a memory 132 and a network interface 134.

The processor 130 illustratively comprises a microprocessor, a microcontroller, an application-specific integrated circuit (ASIC), a field-programmable gate array (FPGA) or other type of processing circuitry, as well as portions or combinations of such circuitry elements.

The memory 132 illustratively comprises random access memory (RAM), read-only memory (ROM) or other types of memory, in any combination. The memory 132 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

The network interface 134 allows the deauthentication server 104 to communicate over the network 106 with the user devices 102, and comprises one or more conventional transceivers.

At least portions of the deauthentication server 104, such as the token generator module 120 and the token management module 122, may be implemented at least in part in the form of software that is stored in memory 132 and executed by processor 130.

For example, as illustrated in the figure, memory 132 illustratively includes one or more exclusive authentication tokens 140 and program code 142 associated with at least one of the modules 120 and 122.

The above-noted network interface 134 may also be used to support various types of communication utilizing additional or alternative channels for communication of information between system entities.

For example, a separate secure channel not involving communication over network 106 may be utilized by the deauthentication server 104 to provide keys or other authentication information to the user devices 102.

It is to be understood that the particular set of elements shown in FIG. 1 for providing deauthentication in a multi-device user environment is presented by way of illustrative example only, and in other embodiments additional or alternative elements may be used. Thus, another embodiment may include additional or alternative devices and other system entities, as well as different arrangements of device modules and other components.

As mentioned previously, various elements of system 100, such as modules 120 and 122 of the deauthentication server 104, may be implemented at least in part in the form of software. Such software is stored and executed utilizing respective memory and processor elements of at least one processing device.

The system 100 may include additional or alternative processing platforms, as well as numerous distinct processing platforms in any combination, with each such platform comprising one or more computers, storage devices or other types of processing devices. A given such processing platform comprises at least one processing device comprising a processor coupled to a memory, and the processing device may be implemented at least in part utilizing one or more virtual machines, containers or other cloud infrastructure.

In some embodiments, a given processing platform may comprise a plurality of virtual machines and one or more associated hypervisors. An example of a commercially available hypervisor platform that may be used to implement portions of the system 100 is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

Cloud infrastructure utilized in a given embodiment can additionally or alternatively be implemented using other types of virtualization techniques, such as Docker containers or other types of containers.

An exemplary process utilizing the deauthentication server 104 in the system 100 will now be described in more detail with reference to the flow diagram of FIG. 2. It is to be understood that this particular process is exemplary only, and additional or alternative processes can be carried out in other embodiments.

In this embodiment, the exemplary process includes steps 200 through 206, which are assumed to be collectively performed by at least a subset of the user devices 102 and the deauthentication server 104.

The term "user" in the context of the present embodiment is assumed to refer to a human user associated with all N of the user devices 102, although other types and arrangements of users may be present in other embodiments.

In step 200, the deauthentication server 104 establishes secure communications with the user devices 102 associated with the particular user. As noted above, such secure communications can be established using pairing protocols or other types of secure communication. It should be noted that different protocols can be used to establish secure communications with different ones of the user devices 102 depending on the particular capabilities of those devices. Accordingly, the deauthentication server 104 can be configured to support multiple distinct secure communication protocols as needed to establish secure communications with the different types of user devices that may be present in a given implementation. Also, the deauthentication server 104 need not establish secure communications with all of the user devices 102 at the same time. Accordingly, in some embodiments the deauthentication server 104 may establish secure communications with only a subset of the plurality of user devices. Such an arrangement may also be utilized in an embodiment in which the deauthentication server is itself implemented on one of the user devices 102 or an additional user device.

In step 202, the deauthentication server 104 via its token generation module 120 generates an exclusive authentication token for utilization by each of the user devices 102 to unlock secure functionality associated with that device. The exclusive authentication token generally comprises authentication information that is required by each of the user devices 102 in order to unlock designated secure functionality on that device.

As mentioned previously, different types of secure functionality can be designated on different ones of the user devices 102. The exclusive authentication token need not take any particular form, but authentication mechanisms on the respective user devices are configured in a straightforward manner such that the corresponding secure functionalities of those devices cannot be unlocked without access to the exclusive authentication token. Access to the exclusive authentication token is controlled by the token management module 122 of the deauthentication server 104.

In some embodiments, the exclusive authentication token is implemented as a signed message that includes a plurality of specified fields. The signed message, when received by a given user device, possibly in combination with additional authentication information such as a password, unlocks the secure functionality of that user device.

As a more particular example, an exclusive authentication token in one or more embodiments may illustratively comprise at least a subset of the following fields:

Token ID: An identifier that uniquely identifies the token.

Token generator ID: An identifier of the deauthentication server that generated the token.

Time of issue: A timestamp that corresponds to the time when the deauthentication server created the token.

Device ID: An identifier that uniquely identifies the user device, and possibly also an associated application or other secure functionality, that should be unlocked with this token.

User ID: An identifier that uniquely identifies a human user that is authorized to use the device with the corresponding Device ID when it is unlocked by this token.

Signature: A piece of cryptographic material that allows the user device to verify the authenticity and integrity of the exclusive authentication token.

The foregoing fields are exemplary only, and other types and combinations of fields can be used in an exclusive authentication token in other embodiments. Examples of possible additional or alternative fields include the following:

Expiration: A timestamp that specifies the time after which the user device should trigger deauthentication.

Unlocking mode: A string that specifies a particular use mode that should apply when this token unlocks the device.

Deauthentication policies: A list of policies that should be enforced when this token unlocks this device. The list of policies can include policies to trigger proactive token retrieval or policies for denying token retrieval requests.

Authentication policies: A list of policies that should be enforced when this token unlocks the device. Policies in this list could include the request of a password from the user, a fingerprint from the user, the physical proximity to a device, or an environment condition, such as location, etc.

Unlocking material: A list of material that the device could use to unlock with this token. The material may comprise cryptographic material. For example, this field could include an access key that is necessary for unlocking a device or application.

Simultaneous devices: A list of the IDs of the devices that share this exclusive authentication token.

Deauthentication servers: A list of deauthentication servers that can be tried when proactively dropping a token.

Again, the above fields are only examples, and other types and configurations of fields can be used in other embodiments. Also, in other embodiments the exclusive authentication token need not comprise a signed message.

In step 204, the exclusive authentication token is provided by the deauthentication server 104 to only a subset of the user devices 102 at a given time. In this embodiment, it is more particularly assumed that the subset is a single one of the user devices 102. Accordingly, the exclusive authentication token is utilizable by only a single one of the user devices 102 at a given time, such that when the secure functionality of any one of the user devices is unlocked, the secure functionality of each of the other user devices is locked.

However, in other embodiments it is possible that subsets of two or more but less than all of the N user devices may have access to the exclusive authentication token at a given time. Accordingly, an exclusive authentication token as the term is broadly utilized in conjunction with these particular illustrative embodiments is "exclusive" in that it is in the possession of only a subset of at least one but less than all of the N user devices of a given multi-device user environment at any given time, under the control of the deauthentication server 104.

In step 206, the deauthentication server 104 via its token management module 122 forces deauthentication of any of the user devices 102 that do not currently have possession of the exclusive authentication token.

For example, after establishing secure communication with at least a first one of the user devices 102, the deauthentication server 104 may receive a request for the exclusive authentication token from the first user device. Such a request may be generated automatically on the first user device in conjunction with an attempt by the user to access the designated secure functionality of the first user device. Responsive to receipt of the request, the deauthentication server 104 via its token management module 122 determines if the exclusive authentication token is available, for example, determines if the exclusive authentication token has been generated and is not currently in the possession of any other ones of the user devices 102. If the exclusive authentication token is available, the token management module 122 provides the exclusive authentication token to the first user device.

It should be noted in this regard that the term "available" in this context is intended to be broadly construed so as to encompass, for example, situations in which the deauthentication server does not deny a request for the exclusive authentication token as well as situations in which a given user device currently in possession of the exclusive authentication token does not deny a token retrieval request from the deauthentication server. Accordingly, the exclusive authentication token can be unavailable based, for example, on denial by the deauthentication server of a request for the token from one of the user devices, as well as denial by one of the user devices of a request for retrieval of the token from the deauthentication server.

The possession by the first user device of the exclusive authentication token, alone or possibly in combination with user entry of other required authentication information such as a password, allows the user to unlock and utilize the designated secure functionality of the first user device.

The deauthentication server 104 may then receive a request for the exclusive authentication token from a second one of the plurality of user devices 102 with which it has established secure communication. Responsive to receipt of this additional request, the deauthentication server 104 via its token management module 122 retrieves the exclusive authentication token from the first user device and provides the exclusive authentication token to the second user device.

The possession by the second user device of the exclusive authentication token, again alone or possibly in combination with user entry of other required authentication information such as a password, allows the user to unlock and utilize the designated secure functionality of the second user device.

In conjunction with retrieval of the exclusive authentication token from the first user device, the first user device is controlled so as to perform one or more deauthentication tasks in order to lock the secure functionality associated with that device. This control may be exercised by the deauthentication server 104 via its token management module 122 or other suitable control mechanism. Additionally or alternatively, the performance of the deauthentication tasks may be controlled by the first user device in an automatic manner responsive to retrieval of the exclusive authentication token by the deauthentication server 104.

These and other arrangements are considered examples of operations falling within the general term of "forcing deauthentication" as that term is broadly used herein. Accordingly, forcing deauthentication by controllably initiating the performance of one or more deauthentication tasks on a given user device from which an exclusive authentication token is retrieved can be performed entirely by a deauthentication server, entirely by the given user device, or by collective action of both the deauthentication server and the given user device.

The particular deauthentication tasks performed by a given one of the user devices 102 responsive to retrieval of the exclusive authentication token from that device by the deauthentication server 104 will vary depending on the type and configuration of the given user device. Some examples of deauthentication tasks include displaying a notification on the user device, locking a credential manager on the first user device, preventing entry of one or more different types of input on the first user device, modifying a display screen of the first user device, and logging out the user on the first user device.

For example, in some embodiments, one of the user devices comprises an automobile that is configured to initiate a request for the exclusive authentication token in conjunction with starting of its engine. Another one of the user devices in such an arrangement may be a mobile telephone of a user also associated with the automobile. Thus, the deauthentication server 104 through appropriate transmission and retrieval of the exclusive authentication token can ensure that certain functionality of the mobile telephone, such as texting or calling functionality, cannot be used while the automobile is in operation.

Priorities for access to the exclusive authentication token can be enforced by the deauthentication server 104, possibly via its token management module 122 and corresponding policy engine 125. For example, in the case of the user device comprising an automobile, the automobile may take priority over other user devices such as a mobile telephone in accessing the exclusive authentication token. Accordingly, determining availability of the exclusive authentication token may in some embodiments further comprise determining if a requesting user device has a higher priority than another requesting user device or another user device that already has possession of the exclusive authentication token.

It should be noted that the access priorities mentioned above are just one example of a type of policy that can be enforced by the policy engine 125 of the token management module 122.

The deauthentication server 104 in some embodiments can therefore be configured such that, responsive to a request for the exclusive authentication token from a first one of the user devices 102, the deauthentication server 104 determines if the exclusive authentication token is already in use by a second one of the user devices. For example, if the exclusive authentication token is already in use by a second user device, and the second user device is a type of device that should not be used simultaneously with the first user device, as in an arrangement in which the first user device comprises the mobile telephone and the second user device comprises the automobile, the deauthentication server 104 via its token management module 122 can deny the request. Numerous other policies put in place via the policy engine 125 of the token management module 122 can also result in denial of a given request for the exclusive authentication token. The request can be reinitiated, for example, after expiration of a certain period time or responsive to notification of availability of the exclusive authentication token or other changed condition within the system 100.

The operations of steps 200 through 206 can be repeated for one or more additional iterations. For example, the steps can be repeated for different sessions each involving different sets of multiple devices associated with a given user. Also, the exclusive authentication token can be periodically regenerated by the token generator module 120 for use in respective distinct iterations of the process.

The deauthentication tasks performed by a given user device in conjunction with retrieval of the exclusive authentication token from that device can be configured to meet the specific needs of a given implementation, such as system policies. For example, deauthentication could trigger a screen lock, trigger a credential manager lock (e.g., locking of an OSX Keychain), close specific applications, or trigger a log out. These actions could be set to minimally impact usability. For example, most modern operating systems have adequate support for suspending and resuming sessions, or for suspending and resuming of single applications.

When deauthentication is triggered by an application (e.g., because a user requested that a document be saved, and the workstation that runs the application cannot contact the deauthentication server), then the application can save the changes in an alternative form before suspending to allow the legitimate user to review and accept these changes when she resumes the session.

In some cases, deauthentication tasks can simply involve user interface notifications that could assist users in gaining awareness of the current status of the devices in the multi-device user environment. The user can then take additional measures as a result of receiving a notification. For example, when a user is currently using a workstation but she is trying to obtain a piece of information from her mobile telephone (e.g., a phone number or an address), then the workstation could simply display notifications on the workstation screen that indicate that the user is now using her mobile telephone. Similarly, the mobile telephone can display a notification when the user is interacting with the workstation. This would help the user to notice that someone else is using her workstation when she is currently using her phone. The following list of actions are examples of deauthentication tasks that could take place individually or in a sequential manner:

1. Notification: The user receives a user interface notification, which signals that deauthentication will take place. This could include a pop-up message, a change in screen border color, an audible signal, or a change in dominant screen tone (e.g., the screen could turn blue).

2. Lock credential manager: If there is a credential manager available (e.g., an OSX Keychain for Apple computers), this could lock such that no application can access credentials until the user reauthenticates.

3. Prevent non-navigation data input to applications: The user could still use applications in read mode but would not be able to make changes. For example, the user could scroll up or down and navigate a document but not add text or click on buttons or menu items that would cause a change.

4. Prevent all input including navigation input: The user will no longer be able to interact with the device. She will not be able to scroll up or down, or navigate a document. The user device would behave as if all of its input devices such as the mouse and keyboard were physically disconnected.

5. Screen dimmer: The screen will gradually dim to indicate that the user needs to reauthenticate.

6. Turn off screen: The screen will turn off but the user device will keep the session open in the background to facilitate the session resuming quickly.

7. Lock screen: The user device will lock the screen, presenting a dialog or mechanism to authenticate the last user or any other legitimate user of the device.

8. Logout: The user device will trigger the logging out of the user. Session data could be lost depending on operating system capabilities.

In some cases, the set of deauthentication tasks that should be performed when the authentication token is retrieved can include deauthorization tasks, possibly enforced by the policy engine of the corresponding user device. This is possible, for example, when an embodiment is used in combination with another authorization system. In other words, when the exclusive authentication token is retrieved, the device that returns the token can trigger deauthorization tasks that would cause a user to no longer be authorized to access a resource or perform an action. For example, in a hospital environment, when a workstation returns the exclusive authentication token, it could deny subsequent authorization requests for modifying patient records for the user that was previously using the workstation (e.g., a nurse). This would be triggered because this individual starts using another device or application, for example, when she starts operating unrelated medical equipment.

Similarly, in the case of preventing texting while driving, deauthentication tasks can include deauthorization tasks. That is, a user could be temporarily unauthorized to use her mobile telephone to read or send text messages or place voice calls, perhaps with the exception of placing and receiving phone calls using a voice activated car feature.

Accordingly, the term "deauthentication tasks" as used herein is intended to be broadly construed, and may include one or more deauthorization tasks.

Various authorization languages that are based on logic, such as Security Policy Assertion Language (SecPAL) and Distributed Knowledge Authorization Language (DKAL), allow for the specification of rich authorization policies and queries. These languages allow an access control monitor to resolve authorization requests based not only on the identity of the principal that requests authorization but also depending on the context and on how policies apply to that context. Embodiments of the invention could be used in combination with such authorization languages to determine what authorization requests will cease to be granted by the access control monitor when an authentication token is retrieved. In some embodiments, the access control monitor is implemented as part of a policy engine, such as a given one of the policy engines 105 on respective ones of the user devices 102.

Figure 2:
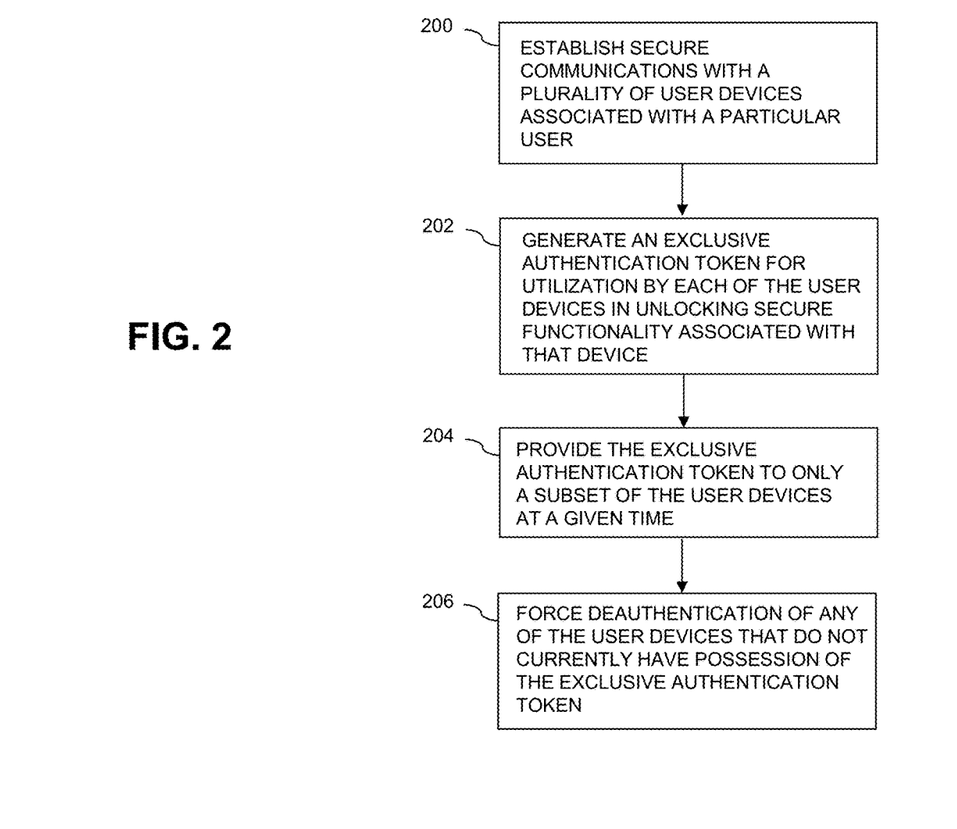
FIG. 2 is a flow diagram of a deauthentication process in an illustrative embodiment.

The particular processing operations and other system functionality described in conjunction with the flow diagram of FIG. 2 are presented by way of illustrative example only, and should not be construed as limiting the scope of embodiments of the invention in any way. Alternative embodiments can use other types of processing operations involving deauthentication in multi-device user environments. For example, the ordering of the process steps may be varied in other embodiments, or certain steps may be performed concurrently with one another rather than serially.

Figure 3:
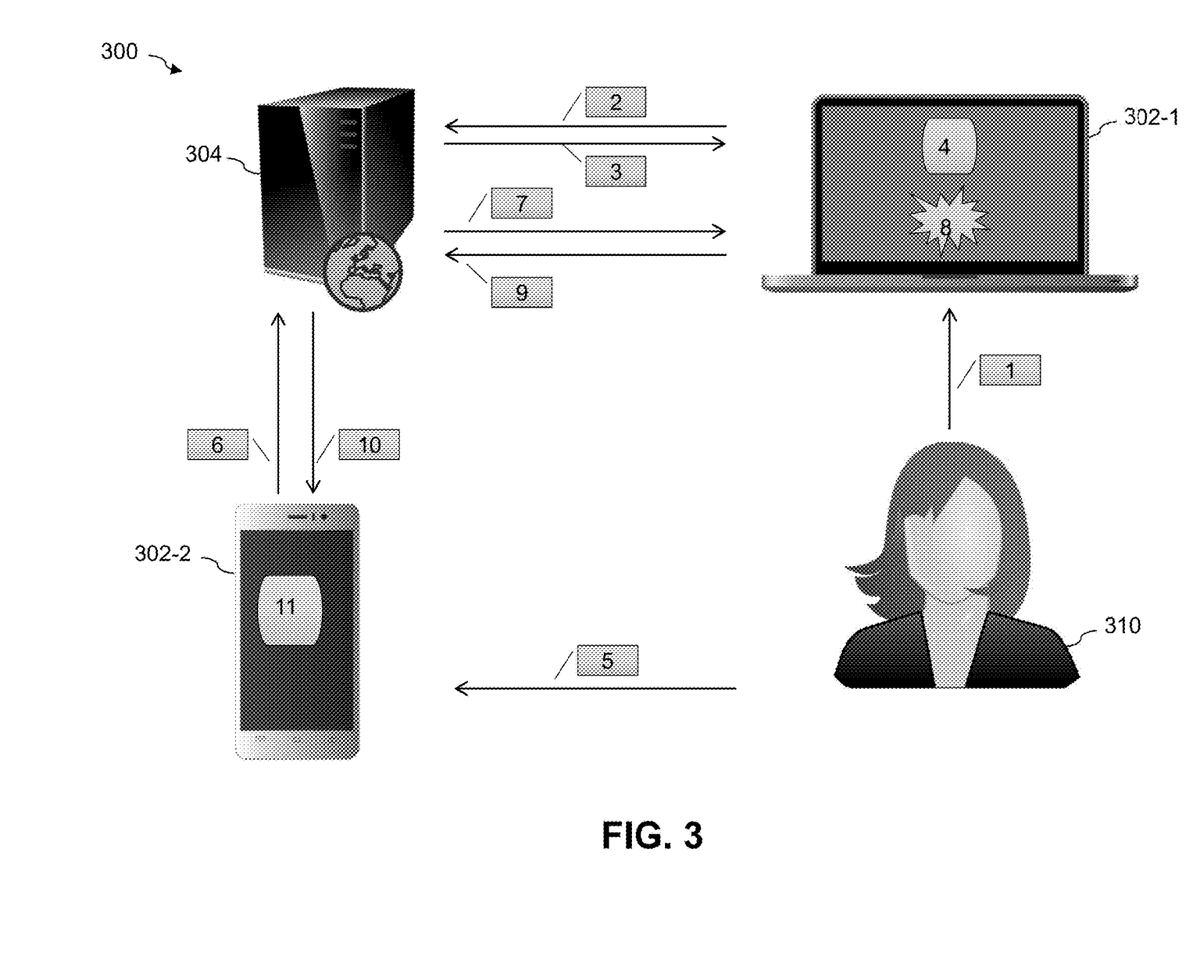
FIGS. 3 and 4 show examples of particular deauthentication arrangements in illustrative embodiments.

Additional details relating to illustrative embodiments of the invention will now be described with reference to FIGS. 3 and 4. As indicated previously, these figures show different possible arrangements of multiple user devices and a deauthentication server in illustrative embodiments. More particularly, FIG. 3 shows an embodiment in which the deauthentication server is implemented by a cloud server or other type of remote server, and FIG. 4 shows an embodiment in which the deauthentication server is implemented by a wearable device, illustratively a smart watch. The FIG. 4 embodiment is well suited for use in preventing mobile telephone access while driving.

With reference initially to FIG. 3, an information processing system 300 comprises first and second user devices 302-1 and 302-2 and a deauthentication server 304. As noted above, the deauthentication server 304 in this embodiment is implemented by a remote server, illustratively comprising a cloud server accessible to the user devices 302 over a network such as the Internet. The user devices 302 collectively comprise a multi-device user environment of a particular user 310. More particularly, the user device 302-1 comprises a mobile telephone and the user device 302-2 comprises a laptop computer.

This embodiment may be configured under an assumption that the user devices 302 have Internet access most of the time, and thus can access the deauthentication server 304 over the Internet as needed. Other embodiments described herein, such as the wearable device embodiment to be described in conjunction with FIG. 4, need not have Internet connectivity to access a deauthentication server.

Also shown in FIG. 3 are interactions between the user devices 302, the deauthentication server 304 and the user 310, in accordance with an example process. These interactions and other processing operations are labeled in the figure with numbers that correspond to the steps of the example process as given below:

1. The user 310 attempts to use her laptop 302-1.
2. The laptop 302-1 requests the exclusive authentication token from the deauthentication server 304.
3. The deauthentication server 304 gives the exclusive authentication token to the laptop 302-1.
4. The laptop 302-1 unlocks its screen.
5. The user 310 attempts to use her mobile telephone 302-2.
6. The mobile telephone 302-2 requests the exclusive authentication token from the deauthentication server 304.
7. The deauthentication server 304 retrieves the exclusive authentication token from the laptop 302-1.
8. The laptop 302-1 triggers performance of one or more deauthentication tasks.
9. The laptop 302-1 sends the exclusive authentication token to the deauthentication server 304.
10. The deauthentication server 304 gives the exclusive authentication token to the mobile telephone 302-2.
11. The mobile telephone 302-2 unlocks.

It is to be appreciated that the foregoing steps are presented by way of illustrative example only, and additional or alternative steps, as well as different arrangements of user devices and deauthentication servers, can be used in other embodiments.

FIG. 4 shows another illustrative embodiment with one such different arrangement of user devices and deauthentication server. In this embodiment, one of the user devices comprises an automobile that when used automatically causes deauthentication of other user devices such as mobile telephones within the same multi-device user environment. Accordingly, this embodiment triggers a "safe driving" mode by a user simply using the automobile, in this case by starting its engine.

As illustrated in the figure, an information processing system 400 comprises first and second user devices 402-1 and 402-2 and a deauthentication server 404. As noted above, the deauthentication server 404 in this embodiment is implemented by a wearable device. The user devices 402 collectively comprise a multi-device user environment of a particular user 410. More particularly, the user device 402-1 comprises a mobile telephone and the user device 402-2 comprises an automobile.

The automobile has an ignition button 412 that when pressed by the user 410 initiates the starting of the engine. The engine does not actually start, however, unless the automobile already has the exclusive authentication token or is able to obtain the exclusive authentication token from the deauthentication server 404.

Also illustrated in the figure are interactions between the user devices 402, the deauthentication server 404 and the user 410, in accordance with an example process. These interactions and other processing operations are labeled in the figure with numbers that correspond to the steps of the example process as given below:

1. The mobile telephone 402-1 is unlocked using the exclusive authentication token as previously provided to the mobile telephone 402-1 by the deauthentication server 404.
2. The user 410 attempts to start her automobile 402-2 by pressing ignition button 412.
3. The automobile 402-2 requests the exclusive authentication token from the deauthentication server 404.
4. The deauthentication server 404 retrieves the exclusive authentication token from the mobile telephone 402-1.
5. The mobile telephone 402-1 triggers performance of one or more deauthentication tasks.
6. The mobile telephone 402-1 gives the exclusive authentication token to the deauthentication server 404.
7. The deauthentication server 404 gives the exclusive authentication token to the automobile 402-2.
8. The automobile 402-2 starts its engine.
9. The user 410 attempts to use her mobile telephone 402-1.
10. The mobile telephone 402-1 requests the exclusive authentication token from the deauthentication server 404.
11. The deauthentication server 404 requests the exclusive authentication token from the automobile 402-2.
12. The automobile 402-2 denies the request, in accordance with a policy implemented by its corresponding policy engine, retaining the exclusive authentication token.
13. The deauthentication server 404 denies the request to obtain the exclusive authentication token by the mobile telephone 402-1.
14. The mobile telephone 402-1 notifies the user 410 that the mobile telephone 402-1 cannot be used.

Again, it is to be appreciated that the foregoing steps are presented by way of illustrative example only, and additional or alternative steps, as well as different arrangements of user devices and deauthentication servers, can be used in other embodiments. For example, the denial of the request for the exclusive authentication token in step 12 above may instead be made by the deauthentication server 404, based on information such as knowledge of a current operating mode of the automobile and relative priorities of access to the exclusive authentication token among the user devices of the multi-device user environment. Numerous other alternative processing operations are possible.

In the FIG. 4 embodiment, deauthentication of the mobile telephone 402-1 could be configured to prevent the use of that device altogether, prevent the use of specific applications, such as texting and other potentially distracting applications, or prevent all use of the device except for a white-listed set of applications, such as navigation applications in safe modes that minimally hinder the ability to operate the vehicle.

Advantageously, the deauthentication in the FIG. 4 embodiment can be enforced even when Internet connectivity is unreliable. The safe driving mode provided in this embodiment can be further enhanced using stronger authentication and identification systems that allow for more accurate identification of the driver.

The FIG. 4 embodiment is an example of one possible arrangement in which the deauthentication server is implemented using a wearable device, illustratively in the form of a smart watch. Other types of wearable devices can be used to implement deauthentication servers as disclosed herein, such as bracelets, pendants, clips, activity trackers, health monitors, etc.

Such arrangements can be particularly useful, for example, in environments where Internet connectivity may not be guaranteed. Also, wearable device implementations of a deauthentication server can be useful in corporate environments in which users may already be required to have a wearable device to access various corporate resources. In some embodiments, parents could require their teenagers to have such a wearable device with them when operating an automobile in order to prevent texting while driving.

The wearable device implementing the deauthentication server 404 in the FIG. 4 embodiment will generally include at least one transceiver, such as a Bluetooth or NFC transceiver, suitable for communicating with each of the user devices of the multi-device user environment. These transceivers are illustrative examples of the network interface previously referred to in the context of the FIG. 1 embodiment. As mentioned previously, various pairing protocols can be carried out between the wearable device and the user devices in order to establish secure communications.

It is also possible that a wearable device implementing a deauthentication server could include one or more sensors. Such sensors could be used, for example, to track user motion or to detect when the user removes the wearable device. In an embodiment of this type, the deauthentication server could automatically retrieve the exclusive authentication token when a motion sensor indicates that the user has stopped interacting with the particular device that currently holds the token, or when another type of sensor indicates that the wearable device has been removed from its user.

For example, if the exclusive authentication token is currently being held by a fixed workstation, the wearable device could retrieve the token from this workstation when the wearable device detects that the user has taken several steps. Radio features, such as proximity decay, could also trigger this process of proactive token retrieval.

Because it is possible that a user wearing the wearable device walks away from a user device faster than the token retrieval process can be triggered, the user device could also drop the token. For example, if a given user device that currently has the token does not detect the wearable device in its vicinity, the user device could automatically drop the token and trigger deauthentication.

In the case in which a wearable device loses connectivity with a first user device that currently holds the token, Internet connectivity can be leveraged to retrieve the token. That is, when a second user device requests the token from the wearable device, but the wearable device cannot retrieve it from the first user device that currently holds it, then the wearable device requests proof of on-line token retrieval from the second user device requesting the token. The second user device requesting the token can contact an on-line deauthentication server, which will contact the first user device that currently has the token, as specified by the wearable device, with a token retrieval request. When the on-line deauthentication server successfully retrieves the token from the first user device, it provides proof that the second user device can give the wearable device, so that the wearable device can grant the token to the second user device.

Depending on policies stored on the wearable device, the wearable device could create a new token when on-line token retrieval is not possible (e.g., due to lack of Internet connectivity). In that case, the deauthentication process may rely on user devices to drop the token when they cannot reach the wearable device.

With additional operating system support, user devices could verify that they can reach the wearable device at very frequent intervals or when observed interactions meet specific criteria, for example, each time that the user opens a specific application or document, or when the user attempts to save changes to a document.

In order to prevent the second user device from maliciously claiming that it cannot trigger an on-line token retrieval proof due to lack of connectivity, the process can involve the user. For example, the user can be prompted by the second user device with a message indicating that the token could not be retrieved due to lack of connectivity. The user will then evaluate the possibility of this connectivity issue and decide if a new authentication token should be created for the second user device.

Additional embodiments can be implemented in a wide variety of different multi-device user environment contexts.

For example, in some embodiments a deauthentication server tracks user interactions with multiple user devices and uses that information to decide which of the user devices is most likely to be currently in use. The deauthentication server provides the exclusive authentication token to the device most likely to be currently in use, and deauthenticates one or more of the other devices, possibly in conjunction with display of notices on the devices to make the user aware of the detected usage of a given one of the devices.

Consider as a further example a situation in which a user is working on her laptop and receives a text message on her mobile telephone. She presses a button on the mobile telephone to see the text message, and possibly also composes and sends a quick response. During that time the laptop screen could display a notification or change color profiles to signal to the user that her mobile telephone is being used. Additionally or alternatively, the screen of the laptop could be locked. If the user actually needs the content of the text message for work on her laptop, then she would be able to do it without a problem if she chose an option of not locking the laptop when another device is in use. Similarly, the user can configure her mobile telephone to not allow input but to leave its screen on while the user is using her laptop, for example, because she is copying material from her mobile telephone.

Other embodiments can be used to support personalization of shared devices. For example, tablet devices are frequently used for controlling entertainment systems, lighting, or home automation, and these devices may be left in common household areas for general use. A deauthentication server can be configured to control the deauthentication of a user on one of these shared tablet devices. When a user is utilizing her mobile telephone at a different location from such a shared tablet, the shared tablet can lock her session so that when another member of the household uses it, the tablet forces an authentication step. The authentication step can be configured to require only minimal effort, such as selecting a user from a list. As a benefit, the new user would be able to receive personalized options, such as favorite settings, channels, etc. Additionally, users would not have to worry about terminating their sessions. Finally, the deauthentication server can enhance the awareness of potential attempts to use a device inappropriately. For example, if a child tried to use a shared tablet as an adult member of the household, the adult would have the ability to detect this and prevent misuse, such as unauthorized purchases.

Embodiments of the invention can be used in combination with a variety of traditional or modern authentication mechanisms. For example, a mobile telephone can request an exclusive authentication token from a deauthentication server when a user enters her personal identification number (PIN) on her mobile telephone, or her password to unlock her workstation. Likewise, if a given user device is using novel authentication mechanisms, such as implicit authentication, then the device can request the token as soon as it detects user interaction. When the user device obtains the token, all other user devices in the multi-device user environment would be deauthenticated, but, because implicit authentication may not be instantaneous, the given user device may decide after a few seconds or minutes that the interaction on that device corresponds with low probability to a legitimate user. In that case the given user device may drop the token, by returning it to the deauthentication server, and deauthenticate the user.

Because the deauthentication actions are flexible, switching between user devices in a given embodiment can be effortless. For example, when deauthentication is used in combination with implicit authentication, deauthentication actions on a mobile telephone and a laptop may include displaying a user interface notification, disabling user input for 30 seconds, and then locking the screen. This would allow a user to use her mobile telephone and her laptop in a seemingly simultaneous fashion but without input being accepted on both devices simultaneously. The notification could be user friendly. For example, a "simultaneous" use interface could involve displaying the screen with a thin colored frame. As a result, the user would be aware of this simultaneous mode, and when the user stops using one of the devices that particular device will lock.

Illustrative embodiments provide significant advantages over the conventional timeout arrangements previously described.

For example, as previously noted, the significant security and usability drawbacks of conventional timeout periods are completely avoided in some embodiments.

This is achieved in some embodiments at least in part by leveraging the recognition that a given user typically cannot provide input simultaneously to multiple distinct devices in his or her multi-device user environment. Accordingly, one or more such embodiments implement a deauthentication server configured to manage the exclusive authentication of a given one of the user devices that is currently receiving input from the user in conjunction with temporary or permanent deauthentication of other ones of the user devices that are not currently receiving input from the user.

Embodiments of the invention are highly flexible in that a wide variety of different implementations can be supported. For example, a deauthentication server can be implemented as an on-line deauthentication server accessible to user devices over a network or with the use of an off-line wearable device, as well as in numerous other arrangements.

In addition, the particular set of one or more tasks triggered by deauthentication in a given embodiment can be configured to satisfy the particular needs of a given embodiment. For example, these tasks can include preventing user input while keeping application windows visible or placing specific applications in the background in a "minimized" format. As another example, deauthentication tasks can involve providing various notifications to the user. It is also possible for the deauthentication tasks to include logging out the user completely, as well as numerous other additional or alternative tasks short of logging out the user.

Moreover, deauthentication approaches disclosed herein can in some embodiments be combined with multiple distinct authentication systems so that users can effortlessly switch from using one device to using another one without worrying about manually locking any of the authentication systems.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platforms, and processing device configurations. Also, different arrangements of multi-device user environments, deauthentication servers, secure communication protocols and processing operations may be used. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
 establishing secure communications with at least a subset of a plurality of user devices associated with a particular user;
 generating an exclusive authentication token for utilization by each of the plurality of user devices to unlock secure functionality associated with that device;
 providing the exclusive authentication token to only a subset of the plurality of user devices at a given time; and
 forcing deauthentication of any of the plurality of user devices that do not currently have possession of the exclusive authentication token;
 wherein the establishing, generating, providing and forcing are performed by a deauthentication server implemented by at least one processing device comprising a processor coupled to a memory;
 wherein the deauthentication server in conjunction with forcing deauthentication of any of the plurality of user devices that do not currently have possession of the exclusive authentication token causes each such user device to perform a lock operation that limits subsequent access to that user device by unauthenticated users; and wherein providing the exclusive authentication token to only a subset of the plurality of user devices at a given time comprises:

retrieving the exclusive authentication token from one of the user devices; and providing the exclusive authentication token to another of the user devices.

2. The method of claim 1 wherein providing the exclusive authentication token to only a subset of the plurality of user devices at a given time comprises providing the exclusive authentication token to only one of the plurality of user devices at a given time.

3. The method of claim 1 wherein providing the exclusive authentication token to only a subset of the plurality of user devices at a given time comprises:

receiving a request for the exclusive authentication token from a first one of the user devices;

determining if the exclusive authentication token is available;

if the exclusive authentication token is available, providing the exclusive authentication token to the first user device;

receiving a request for the exclusive authentication token from a second one of the plurality of user devices;

retrieving the exclusive authentication token from the first user device; and providing the exclusive authentication token to the second user device.

4. The method of claim 3 wherein in conjunction with retrieval of the exclusive authentication token from the first user device the first user device is controlled so as to perform one or more deauthentication tasks in order to lock the secure functionality associated with that device.

5. The method of claim 4 wherein the one or more deauthentication tasks comprise at least one of:

displaying a notification on the first user device;

locking a credential manager on the first user device;

preventing entry of one or more different types of input on the first user device;

modifying a display screen of the first user device; and logging out the user on the first user device.

6. The method of claim 1 wherein the processing device implementing the deauthentication server comprises one of:

a remote server accessible to the plurality of user devices over a network;

a wearable device of the user;

a given one of the plurality of user devices; and an additional user device.

7. The method of claim 1 wherein the plurality of user devices comprises two or more of a desktop computer, a laptop computer, a tablet computer, a mobile telephone, a wearable device and an automobile.

8. The method of claim 1 wherein the exclusive authentication token is utilizable by only a single one of the plurality of user devices at a given time such that when the secure functionality of any one of the user devices is unlocked the secure functionality of each of the other ones of the plurality of user devices is locked.

9. The method of claim 1 wherein providing the exclusive authentication token to only a subset of the plurality of user devices at a given time comprises:

receiving a request for the exclusive authentication token from a first one of the user devices;

if the exclusive authentication token is already in use by a second one of the user devices, and there is a policy in place that conflicts with the request from the first user device, denying the request.

10. A method comprising:

establishing secure communications with at least a subset of a plurality of user devices associated with a particular user;

generating an exclusive authentication token for utilization by each of the plurality of user devices to unlock secure functionality associated with that device;

providing the exclusive authentication token to only a subset of the plurality of user devices at a given time; and forcing deauthentication of any of the plurality of user devices that do not currently have possession of the exclusive authentication token;

wherein one of the user devices comprises an automobile and wherein a request for the exclusive authentication token is initiated by the automobile in conjunction with starting of its engine;

wherein the forced deauthentication of one or more of the user devices other than the automobile is controlled by retrieving the exclusive authentication token from one of said one or more of the user devices other than the automobile and providing the exclusive authentication token to the automobile; and wherein the establishing, generating, providing and forcing are performed by at least one processing device comprising a processor coupled to a memory.

11. A method comprising:

establishing secure communications with at least a subset of a plurality of user devices associated with a particular user;

generating an exclusive authentication token for utilization by each of the plurality of user devices to unlock secure functionality associated with that device;

providing the exclusive authentication token to only a subset of the plurality of user devices at a given time; and forcing deauthentication of any of the plurality of user devices that do not currently have possession of the exclusive authentication token;

wherein the establishing, generating, providing and forcing are performed by at least one processing device comprising a processor coupled to a memory;

wherein said establishing, generating, providing and forcing are performed at least in part by a deauthentication server implemented by said at least one processing device;

wherein the forced deauthentication of one or more of the user devices is controlled by retrieving the exclusive authentication token from one of the user devices and providing the exclusive authentication token to another of the user devices;

wherein the processing device implementing the deauthentication server comprises a wearable device of the user; and wherein the wearable device comprises a smart watch.

12. A non-transitory processor-readable storage medium having stored therein program code of one or more software programs, wherein the program code when executed by at least one processing device causes a deauthentication server implemented by said at least one processing device:

to establish secure communications with at least a subset of a plurality of user devices associated with a particular user;

to generate an exclusive authentication token for utilization by each of the plurality of user devices in unlocking secure functionality associated with that device;

to provide the exclusive authentication token to only a subset of the plurality of user devices at a given time; and to force deauthentication of any of the plurality of user devices that do not currently have possession of the exclusive authentication token;

wherein the deauthentication server in conjunction with forcing deauthentication of any of the plurality of user devices that do not currently have possession of the exclusive authentication token causes each such user device to perform a lock operation that limits subsequent access to that user device by unauthenticated users; and wherein the deauthentication server in providing the exclusive authentication token to only a subset of the plurality of user devices at a given time is configured:

to retrieve the exclusive authentication token from one of the user devices; and to provide the exclusive authentication token to another of the user devices.

13. The processor-readable storage medium of claim 12 wherein the storage medium comprises at least one of an electronic memory and a storage disk.

14. The processor-readable storage medium of claim 12 wherein the program code when executed by at least one processing device further causes the deauthentication server implemented by said processing device:

to receive a request for the exclusive authentication token from a first one of the user devices;

to determine if the exclusive authentication token is available;

if the exclusive authentication token is available, to provide the exclusive authentication token to the first user device;

to receive a request for the exclusive authentication token from a second one of the plurality of user devices;

to retrieve the exclusive authentication token from the first user device; and to provide the exclusive authentication token to the second user device.

15. The processor-readable storage medium of claim 12 wherein the exclusive authentication token is utilizable by only a single one of the plurality of user devices at a given time such that when the secure functionality of any one of the user devices is unlocked the secure functionality of each of the other ones of the plurality of user devices is locked.

16. An apparatus comprising:

at least one processing device comprising a processor coupled to a memory;

said at least one processing device being configured:

to establish secure communications with at least a subset of a plurality of user devices associated with a particular user;

to generate an exclusive authentication token for utilization by each of the plurality of user devices in unlocking secure functionality associated with that device;

to provide the exclusive authentication token to only a subset of the plurality of user devices at a given time; and to force deauthentication of any of the plurality of user devices that do not currently have possession of the exclusive authentication token;

wherein said establish, generate, provide and force operations are performed by a deauthentication server implemented by said at least one processing device;

wherein the deauthentication server in conjunction with forcing deauthentication of any of the plurality of user devices that do not currently have possession of the exclusive authentication token causes each such user device to perform a lock operation that limits subsequent access to that user device by unauthenticated users; and wherein the deauthentication server in providing the exclusive authentication token to only a subset of the plurality of user devices at a given time is configured:

to retrieve the exclusive authentication token from one of the user devices; and to provide the exclusive authentication token to another of the user devices.

17. The apparatus of claim 16 wherein the processing device implementing the deauthentication server comprises one of:

a remote server accessible to the plurality of user devices over a network;

a wearable device of the user;

a given one of the plurality of user devices; and an additional user device.

18. The apparatus of claim 17 wherein the processing device implementing the deauthentication server comprises the wearable device of the user and wherein the wearable device comprises a smart watch.

19. The apparatus of claim 16 wherein the exclusive authentication token is utilizable by only a single one of the plurality of user devices at a given time such that when the secure functionality of any one of the user devices is unlocked the secure functionality of each of the other ones of the plurality of user devices is locked.

20. The apparatus of claim 16 wherein one of the user devices comprises an automobile and wherein a request for the exclusive authentication token is initiated by the automobile in conjunction with starting of its engine.

* * * * *